Figure 1:
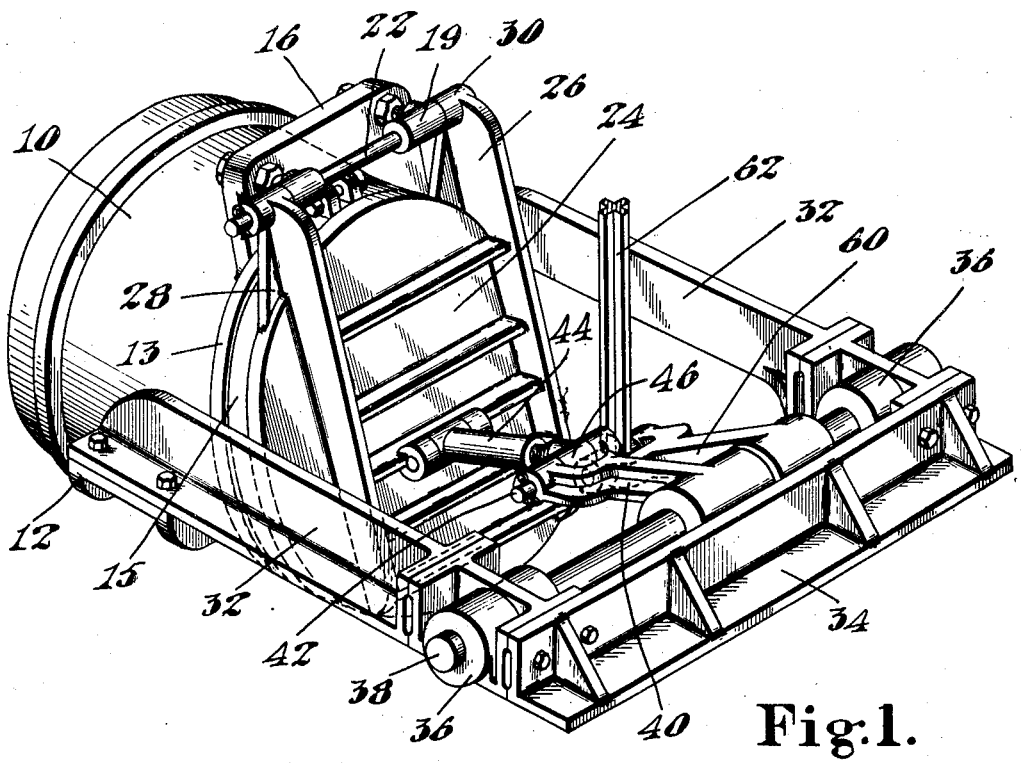

May 21, 1929.   R. J. McNULTY   1,714,182
REGULATOR VALVE FOR PIPE LINES
Filed April 7, 1928

INVENTOR
Richard J. McNulty
by H. W. Kenway. Atty

Patented May 21, 1929.

1,714,182

UNITED STATES PATENT OFFICE.

RICHARD J. McNULTY, OF BOSTON, MASSACHUSETTS.

REGULATOR VALVE FOR PIPE LINES.

Application filed April 7, 1928. Serial No. 268,166.

This invention relates to automatic regulator valves for controlling the flow in pipe lines as, for example, the flow from a branch sewer into a main sewer or at any other point in a pipe line system where intermittent flow is desirable.

In the prior patent to Dodd and McNulty, No. 993,587, May 30, 1911, there is disclosed an automatic regulator valve for this general purpose, including a valve gate operated by toggle mechanism controlled by a float and acting to close or open an inlet port. The particular service required of devices of this kind involves continuous operation for long periods of time without inspection or adjustment. It is important, therefore, that the valve gate should be set with accuracy so that it will seat fairly and prevent leakage when closed and open freely without binding or cramping when relief should occur. It is, moreover, important that the mounting of the valve gate should be free and clear of the sand and grit carried by the sewer so as to avoid undue wear on this account. With these considerations in view, an important feature of the present invention consists in an inlet pipe section having an upwardly extending flange, in which is mounted a pair of spaced, independently adjustable, supporting members which carry a transverse hinge pin for the valve gate. With such a construction, the valve gate may be bodily adjusted toward or from its seat or it may be angularly adjusted to bring the plane of its face into exact coincidence with the plane of the valve seat and the most favorable operating conditions thereby secured.

It will be apparent that in automatic regulator valves for sewers of large diameter, for example, 24 inches or over, a very considerable hydraulic pressure is to be dealt with and, consequently, severe stress is imposed upon the moving and supporting parts of the mechanism. Other features of the invention, accordingly, relate to improvements in the structure and arrangement of the valve gate operating mechanism and its supporting frame. An important feature consists in a yoke-shaped frame adapted to be secured rigidly at its free ends to the inlet pipe section and forming with the latter a self-contained structure within which the toggle mechanism and its operating shaft are symmetrically mounted, so that the stresses encountered in operation are balanced as far as possible without tendency to cause cramping or springing in the parts.

Another feature of the invention consists in the provision of means for insuring positively that the toggle links operating the valve gate shall not be broken past their center position and in the provision of novel means for adjusting the effective length of the toggle links and imparting operating movement thereto.

Figure 2:
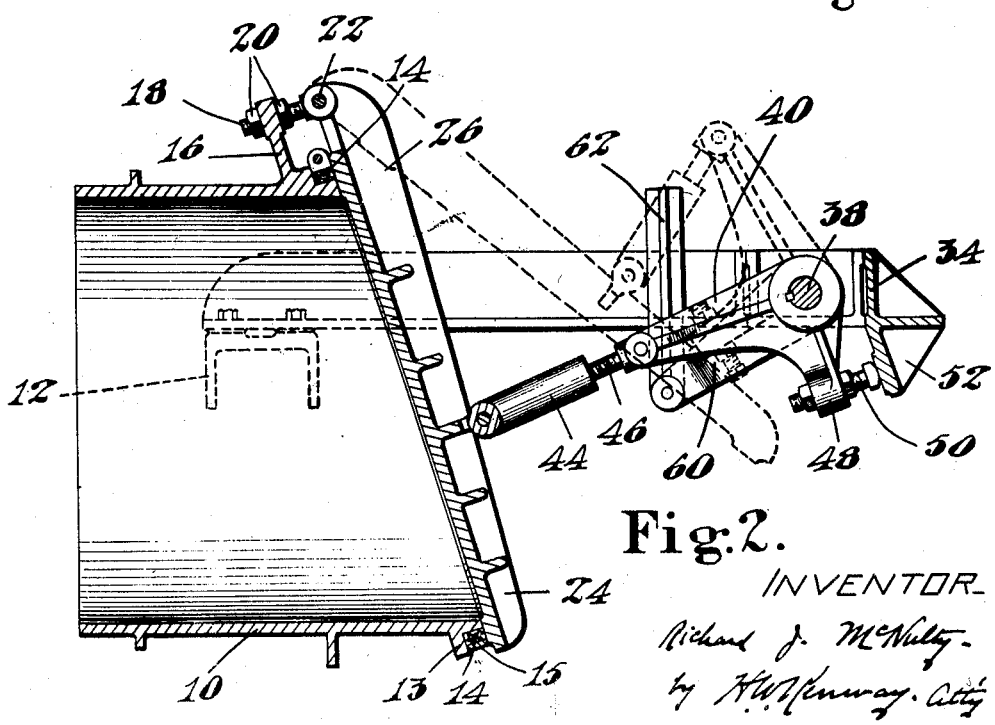

These and other features of the invention will be best understood and appreciated from the following description of a preferred embodiment thereof, selected for purposes of illustration and shown in the accompanying drawings, in which Fig. 1 is a view, in perspective; and
Fig. 2 is a longitudinal sectional view.

The automatic regulator valve and its associated mechanism is adapted to be located in a manhole chamber having inlet and outlet passages. The pipe section 10 constitutes the inlet and the valve automatically controls the flow of sewage from this inlet, generally in accordance with the sewage level maintained in an adjoining float chamber, although the manner of control is not important from the standpoint of the present invention.

The inlet pipe section is flanged and may be set in masonry as the terminal section of a sewer pipe line. Its inner end is cut obliquely and an inclined valve seat is formed by a heavy ring of rubber 14 backed up by an oblique circumferential flange 13. From the upper portion of the section 10 extends an integral flange 16, having substantially the same slope as the plane of the valve seat. The flange 16 is located slightly to the rear of the end of the pipe section and is provided with two forwardly projecting supports 18, comprising threaded rods each provided at its forward end with a head or hub 19 having a transverse bore. The flange 16 is perforated to receive the threaded stems of the supports 18 and each of the latter is securely and adjustably maintained in position by a pair of lock nuts 20, one disposed on each face of the flange 16. The hubs 19 of the supports carry a transversely extending hinge pin 22, upon the outer ends of which the valve gate 24 is suspended.

The valve gate is a circular casting of sufficient size to overlap the valve seat formed by the ring 14. It has a plane inner face and has on its outer face transverse and vertical ribs for stiffness. The vertical ribs 26 are extended upwardly beyond the periphery of the valve gate, merging into ears 28 which extend from the upper margin of the valve gate 24 and terminate in hubs 30, spaced to receive the supports 18 between them and having a transverse bore to receive the ends of the hinge pin 22. The hinge pin is free to turn in both of the hubs 19 of the supports and the hubs 30 of the valve gate, and is maintained against longitudinal displacement by suitable washers and cotter pins.

It will be apparent that by suitable manipulation of the lock nuts 20 the supports may be adjusted to locate the hinge pin 22 nearer to or further away from the plane of the valve seat or to vary its angular position when this is necessary to establish parallelism between the hinge pin and the plane of the valve seat. The construction above described, therefore, affords convenient means for securing the accurate adjustment of the valve gate setting required and for maintaining the desired setting after it has once been secured.

The inlet pipe section 10 is provided at each side with an outwardly extending integral lug or ear 12. The valve operating mechanism is mounted in and carried by a yoke-shaped frame, comprising side members 32 and a cross girt 34 bolted rigidly together and secured at its free ends to the ears 12 on the pipe section. The frame, therefore, forms with the pipe section a rigid self-contained structure which may be supplied with a masonry foundation or supported in any other permanent fashion.

The yoke-shaped frame includes positively secured sections having bearings 36 for a transverse shaft 38. Toggle links are interposed between the shaft and the valve gate 24. The forked toggle link 40 is keyed to the shaft 38 midway between the bearings 36 and carries between its arms the toggle pin 42. The other toggle link is pivotally connected to one of the transverse flanges of the valve gate and comprises a sleeve member 44 internally threaded to receive a T-shaped member 46, having its threaded stem screwed into the sleeve member 44 and its head disposed between the arms of the forked toggle link 40 and perforated to receive the toggle pin 42 which is retained in place by suitable washers and cotter pins. In its most advantageous setting, the toggle assumes a position just off center when the valve gate is fully seated and this desirable condition may be secured by adjusting the length of the toggle link 44—46 by temporarily removing the toggle pin 42 and turning the stem piece 46 in or out of the sleeve piece 44.

Regardless of the setting of the toggle, it is important that it should not break past its center position and in order to prevent this contingency, the toggle link 40 is provided with a downwardly extending arm 48 carrying an adjustable stop 50, arranged to engage a lug 52 projecting downwardly from the cross girt of the frame. The stop 50 may be adjusted and set in the arm 48 so as to limit the position of the toggle substantially to that shown in Fig. 2. Under these conditions, free opening of the valve gate is assured and there is no danger of its being locked in closed position, as might occur if the toggle were to be broken past its center position.

An arm 60 is keyed to the shaft 38 in a position adjacent to the right-hand bearing 36, as viewed in Fig. 1. This arm is forked at its outer end to receive a connecting rod 62 which may be operated through any desired form of float mechanism or otherwise for swinging the arm 60 upwardly, turning the shaft 38 and opening the valve gate through the action of the toggle links.

The valve gate 24 is limited in its opening movement by engagement with the end of the arm 48 which forms a part of the toggle link 40. This also limits the movement of the arm 60 and, consequently, of the float mechanism so that, if desired, the float may be suspended above the floor of its compartment when the valve gate occupies its wide-open position.

It will be noted that the opening and closing pressure upon the valve gate 24 is transmitted entirely through the toggle links which are connected to the gate at a point symmetrically disposed with respect to its area. The other end of the toggle links is supported at the center of the shaft 38 and this in turn is tied at both ends to the pipe section. The result is that all the stress of operating the valve gate is balanced in the self-contained rigid structure of the yoke-shaped frame and pipe section. There is no tendency, therefore, to shift or displace any part of the structure upon its foundations nor is any stress transmitted to the foundations. This favorable condition is an important advantage incident to my invention and contributes to the successful operation and long life of installations in which it is embodied.

Having thus described my invention, what I claim as new and desire to secure by Letters Patent is:

1. A sewer regulator valve comprising a pipe section having a valve seat, an integral flange extending upwardly from the periphery of the pipe section at a point in the rear of said seat, a pair of spaced supports projecting forwardly from said flange and being independently adjustable with reference to the plane of the valve seat, a transverse hinge pin carried by said supports, and a valve gate pivotally mounted on said hinge pin.

2. A sewer regulator valve comprising a pipe section with its end surface cut obliquely to form an inclined valve seat, an inclined flange extending upwardly from the periphery of said section, a pair of supporting members carried by said flange, projecting substantially into the plane of the valve seat and being independently adjustable, a transverse hinge pin extending between said supports, and a valve gate having upwardly extending spaced arms to receive said hinge pin.

3. A sewer regulator valve comprising a pipe section having integral side lugs, a yoke-shaped frame secured at its ends to said lugs and forming a self-contained structure with said pipe section, a valve gate for closing the end of the pipe section, a shaft journaled at both ends in said frame, and toggle connections between said shaft and gate.

4. A sewer regulator valve comprising a pipe section, a hinged valve gate carried thereby, a yoke-shaped frame secured at its ends to said pipe section, a shaft journaled at both ends in said frame, toggle links interposed between said frame and valve gate, an arm extending downwardly from said shaft and carrying an adjustable stop, and a cooperating abutment formed on the frame and acting to limit the straightening of the toggle links.

5. A sewer regulator valve comprising a pipe section, a hinged valve gate carried thereby, an operating shaft spaced from the gate, and toggle links interposed between said shaft and gate comprising a forked link carrying a toggle pin and an adjustable two-part link having a threaded part with a head perforated to receive said toggle pin.

6. A sewer regulator valve comprising a pipe section, a hinged valve gate carried thereby, a yoke-shaped frame connected to said pipe section and forming a self-contained structure therewith, an operating shaft journaled in said frame, toggle links interposed between said shaft and gate, an operating arm on said shaft disposed within said frame, and float actuated means connected with said arm.

7. A regulator valve for pipe lines comprising a pipe section, a valve gate hinged to swing on an axis above said pipe section, an operating shaft spaced from the gate, and toggle links interposed between said shaft and gate, one of said links being forked and the other comprising extensible parts threaded together, one part having a pin connection to the valve and the other a similar connection to the other toggle link.

8. A regulator valve for pipe lines comprising a pipe section, a yoke-shaped frame secured at its ends to said pipe section and forming therewith a self-contained structure, a hinged valve gate for closing the end of the pipe section, a shaft journaled in said frame, spaced from the gate and disposed parallel to the pivot of the gate, and toggle connections between said shaft and gate.

RICHARD J. McNULTY.